(12) United States Patent
Hiraoka

(10) Patent No.: US 8,180,781 B2
(45) Date of Patent: May 15, 2012

(54) INFORMATION PROCESSING APPARATUS, METHOD, AND COMPUTER-READABLE RECORDING MEDIUM FOR PERFORMING FULL TEXT RETRIEVAL OF DOCUMENTS

(75) Inventor: Takuya Hiraoka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 399 days.

(21) Appl. No.: 12/473,616

(22) Filed: May 28, 2009

(65) Prior Publication Data

US 2009/0300007 A1 Dec. 3, 2009

(30) Foreign Application Priority Data

May 28, 2008 (JP) ................................. 2008-139762
Mar. 26, 2009 (JP) ................................. 2009-077243

(51) Int. Cl.
G06F 17/30 (2006.01)
(52) U.S. Cl. ........................ 707/748; 707/758
(58) Field of Classification Search .................. 707/748, 707/758
See application file for complete search history.

(56) References Cited

U.S. PATENT DOCUMENTS

| | | | |
|---|---|---|---|
| 6,901,399 B1 * | 5/2005 | Corston et al. .................... | 1/1 |
| 2004/0205448 A1 * | 10/2004 | Grefenstette et al. ......... | 715/500 |
| 2006/0230031 A1 | 10/2006 | Ikeda et al. | |
| 2006/0253274 A1 * | 11/2006 | Miller ............................... | 704/9 |
| 2007/0050421 A1 * | 3/2007 | Kohno ........................ | 707/200 |
| 2007/0244915 A1 * | 10/2007 | Cha et al. ...................... | 707/101 |
| 2008/0152218 A1 * | 6/2008 | Okada ........................... | 382/159 |

FOREIGN PATENT DOCUMENTS

| | | |
|---|---|---|
| JP | 2006-31209 | 2/2006 |
| JP | 2006-331117 | 12/2006 |

OTHER PUBLICATIONS

Hiroko Mano et al., "Ranking Retrieval in Document Retrieval", Ricoh Technical Report No. 29, Dec. 12, 2003, pp. 21-30 (with English Abstract).

Kazuaki Kishida, "Techniques of Document Clustering: a Review", Library and Information Science No. 49, 2003, pp. 33-75 (with English Abstract).

* cited by examiner

Primary Examiner — Son T Hoang
(74) Attorney, Agent, or Firm — Oblon, Spivak, McClelland, Maier & Neustadt, L.L.P.

(57) ABSTRACT

An information processing apparatus for creating a retrieval result displaying a list of retrieval documents. Retrieval documents corresponding to a retrieval condition are classified into groups based on scores indicating degrees of relevance to the retrieval condition. A clustering process is conducted with respect to the retrieval documents in a group, for each of groups to which the retrieval documents belong.

6 Claims, 16 Drawing Sheets

FIG.6

STRUCTURE 1

| KEYWORD | DOCUMENT FREQUENCY |
|---|---|
| NETWORK | 5 |
| DATABASE | 2 |
| ⋮ | ⋮ |

STRUCTURE 2

| DOCUMENT ID | FREQUENCY IN DOCUMENT |
|---|---|
| 1 | 10 |
| 2 | 4 |
| 3 | 90 |
| 4 | 2 |
| 5 | 3 |

| DOCUMENT ID | FREQUENCY IN DOCUMENT |
|---|---|
| 1 | 2 |
| 4 | 6 |

| DOCUMENT ID | FREQUENCY IN DOCUMENT |
|---|---|
| ⋮ | ⋮ |

STRUCTURE 3

| DOCUMENT ID | DOCUMENT LENGTH |
|---|---|
| 1 | 100 |
| 2 | 50 |
| 3 | 300 |
| 4 | 200 |
| 5 | 500 |
| ⋮ | ⋮ |

FIG.7

| DOCUMENT ID | SCORE | ATTRIBUTE |
|---|---|---|
| 1 | 0.986 | TITLE 1 |
| 3 | 0.976 | TITLE 2 |
| 10 | 0.956 | TITLE 1' |
| 5 | 0.923 | TITLE 2' |
| 4 | 0.609 | TITLE 3 |
| 2 | 0.607 | TITLE 3' |
| 6 | 0.557 | TITLE 4 |
| 7 | 0.507 | TITLE 3" |

FIG.8

| DOCUMENT ID | SCORE | ATTRIBUTE | |
|---|---|---|---|
| 1 | 0.986 | TITLE 1 | ⎫ |
| 3 | 0.976 | TITLE 2 | ⎬ CLUSTER A |
| 10 | 0.956 | TITLE 1' | |
| 5 | 0.923 | TITLE 2' | ⎭ |
| 4 | 0.609 | TITLE 3 | ⎫ CLUSTER B |
| 2 | 0.607 | TITLE 3' | ⎭ |
| 6 | 0.557 | TITLE 4 | ⎫ CLUSTER C |
| 7 | 0.507 | TITLE 3" | ⎭ |

FIG.9

| DOCUMENT ID | SCORE | ATTRIBUTE | |
|---|---|---|---|
| 1 | 0.986 | TITLE 1 | CLUSTER A |
| 3 | 0.976 | TITLE 2 | CLUSTER A |
| 10 | 0.956 | TITLE 1' | CLUSTER A |
| 5 | 0.923 | TITLE 2' | CLUSTER A |
| 4 | 0.609 | TITLE 3 | CLUSTER B |
| 2 | 0.607 | TITLE 3' | CLUSTER B |
| 6 | 0.557 | TITLE 4 | CLUSTER B |
| 7 | 0.507 | TITLE 3" | CLUSTER B |

FIG.10

| DOCUMENT ID | FEATURE WORD AND WEIGHT (FEATURE WORD, WEIGHT) |
|---|---|
| 1 | (FULL TEXT,1) (RETRIEVAL,1) (INVERSION,1) (SCORE,1) |
| 2 | (FULL TEXT,1) (DATA,1) (MINING,1) (HIGH SPEED,1) |
| 3 | (FULL TEXT,1) (RETRIEVAL,1) (VECTOR,1) (HIGH SPEED,1) |
| 4 | (FULL TEXT,1) (DATA,1) (MINING,1) (HIGH SPEED,1) |
| 5 | (FULL TEXT,1) (RETRIEVAL,1) (VECTOR,1) (HIGH SPEED,1) |
| 6 | (FULL TEXT,1) (RETRIEVAL,1) (VECTOR,1) (HIGH SPEED,1) |
| 7 | (FULL TEXT,1) (DATA,1) (MINING,1) (INDEX,1) |
| 8 | (DATABASE,1) (B-TREE,1) (HIGH SPEED,1) (STRUCTURE,1) |
| 9 | (DATABASE,1) (B-TREE,1) (HIGH SPEED,1) (STRUCTURE,1) |
| 10 | (FULL TEXT,1) (RETRIEVAL,1) (INVERSION,1) (WEIGHT,1) |

FIG.11

| DOCUMENT ID | SCORE | CLUSTER NUMBER | ATTRIBUTE |
|---|---|---|---|
| 1 | 0.986 | 1 | TITLE 1 |
| 10 | 0.956 | 1 | TITLE 1' |
| 3 | 0.976 | 2 | TITLE 2 |
| 5 | 0.923 | 2 | TITLE 2' |
| 4 | 0.609 | 3 | TITLE 3 |
| 2 | 0.607 | 3 | TITLE 3' |
| 7 | 0.507 | 3 | TITLE 3'' |
| 6 | 0.557 | 4 | TITLE 4 |

FIG.12

| | FULL TEXT RETRIEVAL SYSTEM | |
|---|---|---|
| | KEYWORD    × × × | |
| RETRIEVAL RESULT | | |
| 1. | ▼TITLE 1 | 0.986 |
| 2. | ▼TITLE 2 | 0.976 |
| 3. | ▼TITLE 3 | 0.609 |
| | ─ TITLE 3' | 0.607 |
| | ─ TITLE 3" | 0.507 |
| 4. | TITLE 4 | 0.557 |

FIG.15

| DOCUMENT ID | SCORE | CLUSTER NUMBER | ATTRIBUTE |
|---|---|---|---|
| 1 | 0.986 | 1 | TITLE 1 |
| 10 | 0.956 | 1 | TITLE 1' |
| 3 | 0.976 | 2 | TITLE 2 |
| 5 | 0.923 | 2 | TITLE 2' |
| 6 | 0.557 | 2 | TITLE 4 |
| 4 | 0.609 | 3 | TITLE 3 |
| 2 | 0.607 | 3 | TITLE 3' |
| 7 | 0.507 | 3 | TITLE 3" |

FIG.16

| | FULL TEXT RETRIEVAL SYSTEM | |
|---|---|---|
| | KEYWORD  × × × | |
| RETRIEVAL RESULT | | |
| 1. | ▼TITLE 1 | 0.986 |
| 2. | ▼TITLE 2 | 0.976 |
| | ├─ TITLE 2' | 0.923 |
| | └─ TITLE 4 | 0.557 |
| 3. | ▼TITLE 3 | 0.609 |

INFORMATION PROCESSING APPARATUS, METHOD, AND COMPUTER-READABLE RECORDING MEDIUM FOR PERFORMING FULL TEXT RETRIEVAL OF DOCUMENTS

BACKGROUND OF THE INVENTION

1. Field of the Invention

The present invention is related to an information processing apparatus, a full text retrieval method, and a computer-readable encoding medium recorded with a computer program thereof.

2. Description of the Related Art

In many full text retrieval systems using an inversion index, when displaying a retrieval result list, a relevance ratio of a key word being input and each of documents being retrieved is depicted by a numerical value as a score, and the documents are ordered in a greater ratio order (for example, refer to "Hiroko Mano, Hideo Itoh, Yasushi Ogawa, 'Ranking Retrieval In Document Retrieval', Ricoh Technical Report, No. 29, Dec. 12, 2003"). In general, the score denotes a degree of relevance to the documents found with respect to the key word being input. The degree of relevance to the documents is based on an appearance frequency of the key word in the document.

For the scores of the documents with respect to the retrieval word, a PageRank using link information among documents is used in a search engine of the Web. However, the PageRank is not operative for data in which the link information does not exist. In a case of retrieving document data or a like in a business organization, in general, a probabilistic model is preferably used for a ranking retrieval of the documents.

There are a few cases in that only an original document is a retrieval subject when retrieving document data or a like in the business organization. In other words, for example, the same documents being distributed to each department are redundantly registered in a database. Moreover, documents regarding a project document, a specification, and a like, of which contents are similar to each other and only a document version is different from each other, are registered in the database. Thus, if the ranking retrieval is simply conducted with respect to like this document set, score values of the same documents and analogous documents become approximately the same values. Accordingly, when the documents are listed in a score order, it is not easy to distinguish documents when analogous documents are successively displayed. In addition, it is difficult to reach a target document.

Japanese Laid-open Patent Application No. 2006-31209 discloses a full text retrieval method which allows a user to customize a score in the ranking retrieval of documents. By using the full text retrieval method, only original documents are listed at higher scores. However, since the business organization stores a huge amount of document data, it takes time and is not practical to customize scores of all original documents. Also, it is difficult to specify the original documents.

For this problem, a document clustering technology is well known to classify the same or analogous documents (for example, refer to "Kazuaki Kishida, Techniques of Document Clustering: A Review, Library and Information Science No. 49, 2003"). By using the document clustering technology, the same or analogous documents are grouped as a retrieval subject. Then, only a representative document in each group is displayed as a retrieval result. As a result, it is possible to avoid displaying documents having similar contents as the retrieval result.

However, in the document clustering technology of Kazuaki Kishida, a considerably large amount of calculation is required. In a case of a huge amount of retrieval subjects, it is not practical to classify all retrieval subject beforehand due to the considerably large amount of calculation.

SUMMARY OF THE INVENTION

The present invention solves or reduces one or more of the above problems.

In an aspect of this disclosure, there is provided an information processing apparatus for creating a retrieval result displaying a list of retrieval documents, including: a document retrieval part configured to retrieve the retrieval documents corresponding to a retrieval condition by conducting a full text retrieval of documents; a document scoring part configured to order the retrieval documents by scores indicating degrees of relevance to the retrieval condition; a feature word file database configured to register a document identification identifying a document, feature words extracted from full text data of the document, and weight values indicating weights of the feature words in which the feature words and the weight values are corresponded to the document identification, for each of the documents; and a document clustering part configured to conduct a clustering process with respect to the retrieval documents based on the feature words and the weight values of the feature words acquired from the feature word file database, by using the document identifications of the retrieval documents as keys, wherein the information processing apparatus further includes a document grouping part configured to group the retrieval documents based on the scores, wherein the document clustering part conducts the clustering process with respect to the retrieval documents in a group, for each of groups to which the retrieval documents are grouped by the document grouping part.

In other aspects of this disclosure, there may be provided a full text retrieval method conducted in the information processing apparatus, a computer program product for causing a computer to conduct a full text retrieval, and a computer-readable encoding medium recorded with a computer program for causing a computer to conduct a full text retrieval.

BRIEF DESCRIPTION OF THE DRAWINGS

In the following, embodiments of the present invention will be described with reference to the accompanying drawings.

FIG. 6 is a diagram illustrating a typical data structure of the index file;

FIG. 7 is a diagram illustrating a state in which scores are calculated with respect to the retrieval documents and the retrieval documents are sorted in a descending order of the scores;

FIG. 8 illustrates a retrieval result from conducting a first clustering process;

FIG. 9 is a diagram illustrating a result example from conducting the first clustering process;

FIG. 10 is a diagram illustrating an example of the feature word file;

FIG. 11 is a diagram illustrating a result from conducting a second clustering process;

FIG. 12 is a diagram illustrating a retrieval result example;

FIG. 15 is a diagram illustrating an example of a merge process result from merging between clusters; and FIG. 16 is a diagram illustrating an example of a retrieval result after the merge process is conducted.

DESCRIPTION OF THE PREFERRED EMBODIMENT

In the following, the present invention to will be described with reference to the accompanying drawings.
(Network Configuration)

Figure 1:
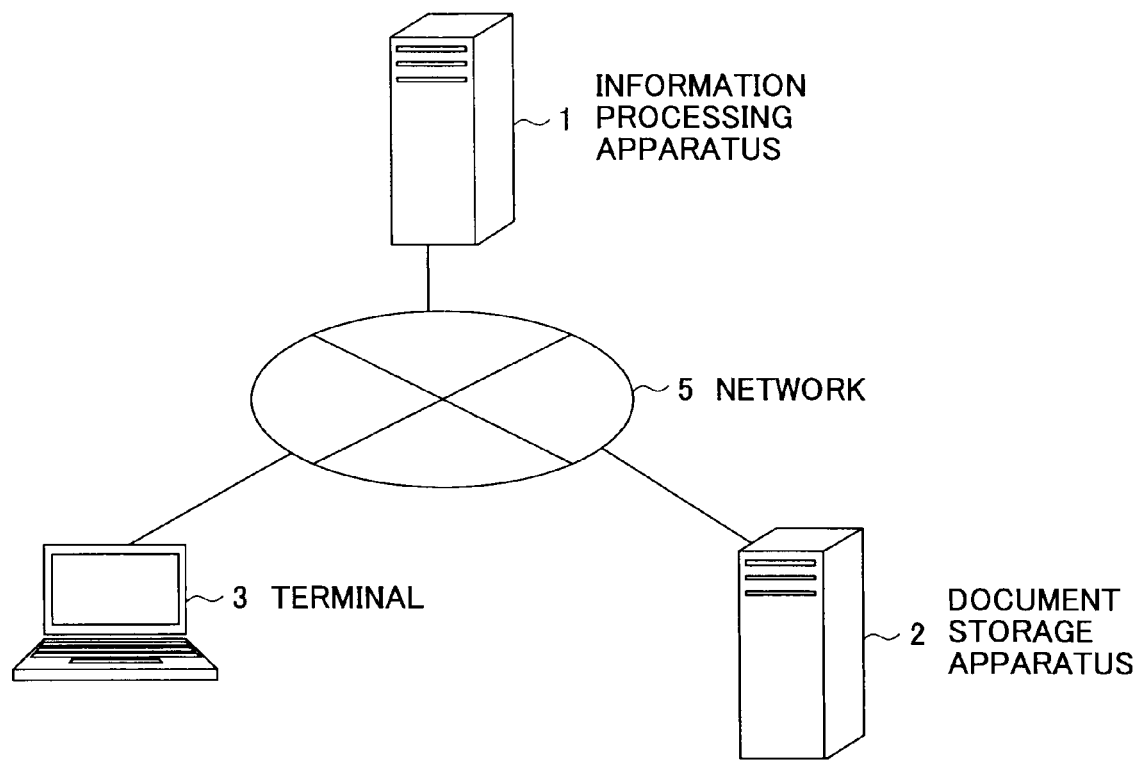
FIG. 1 is a block diagram illustrating a network configuration in which an information processing apparatus according to the present invention, a document storage apparatus, and a terminal are connected via a network.

First, a network configuration for carrying out the present invention will be described, before describing details of the present invention. FIG. 1 is a block diagram illustrating the network configuration in which an information processing apparatus 1, a document storage apparatus 2, and a terminal 3 are connected via a network 5. The information processing apparatus 1 is a full text retrieval server according to the present invention. The document storage apparatus 2 stores documents which are to be retrieval subjects. The terminal 3 is a client terminal using the information processing apparatus 1. The terminal 3 accesses the information processing apparatus 1 through the network 5. The information processing apparatus 1 retrieves a target document by using a retrieval word from a plurality of documents being stored in the document storage apparatus 2 in response to a request from the terminal 3. This is so-called "full text retrieval system". The network 5 may include wired and wireless networks. FIG. 1 exemplifies a configuration to explain one embodiment of the present invention. For example, a plurality of document storage apparatuses 2 and a plurality of terminals 3 may be configured in this configuration. Alternatively, the information processing apparatus 1 may include a document storage function and the document storage apparatus 2 can be omitted.
(Information Processing Apparatus)

Figure 2:
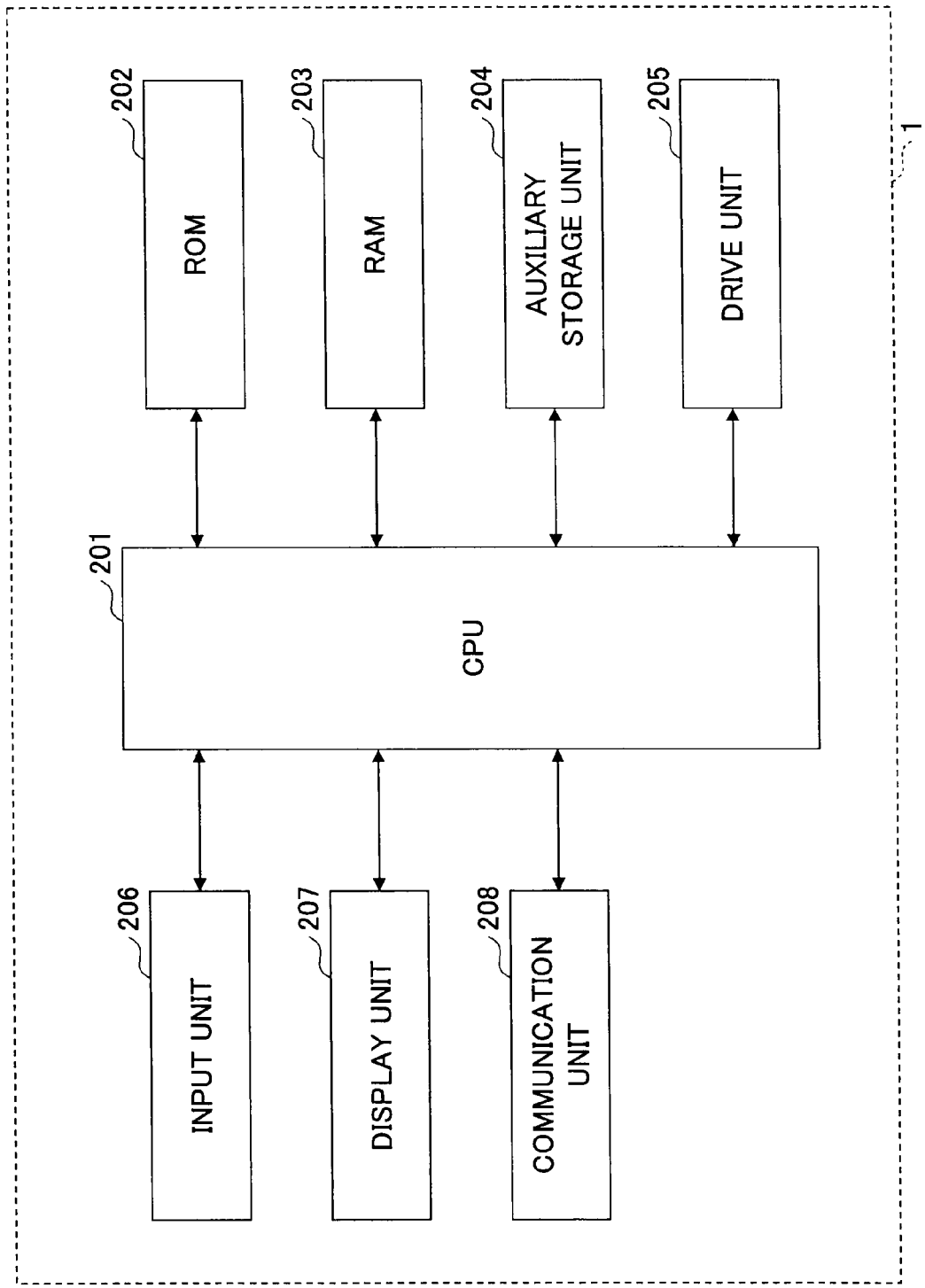
FIG. 2 is a diagram illustrating a hardware configuration of the information processing apparatus according to the present invention.

FIG. 2 is a diagram illustrating a hardware configuration of the information processing apparatus 1 according to the present invention. The hardware configuration of the information processing apparatus 1 will be briefly described. The information processing apparatus 1 includes a CPU (Central Processing Unit) 201, a ROM (Read Only Memory) 202, a RAM (Random Access Memory) 203, an auxiliary storage unit 204, a drive unit 205, an input unit 206, a display unit 207, and a communication unit 208, as main units.

The CPU 201 is configured by a micro processor and peripheral circuits, and is a circuit to control the entire information processing apparatus 1. Also, the ROM 202 stores a predetermined control program (software components) which is executed by the CPU 201. The RAM 203 is used as a working area to conduct various controls in which the CPU 201 executes the predetermined control program (software components) stored in the ROM 202.

The auxiliary storage unit 204 stores various information including a general OS (Operating System), and a full text retrieval program. An HDD (Hard Disk Drive) or a like being non-volatile storage device is used as the auxiliary storage unit 204. The various information may be stored in a recording medium such as a CD-ROM (Compact Disk-ROM), a DVD (Digital Versatile Disk), or a like, or other media, other than the auxiliary storage unit 204. The various information stored in these recording media can be read out through the drive unit 205. Accordingly, the various information can be acquired by setting a recording medium to the drive unit 205.

The input unit 206 is used for a user to conduct various input operations. The input unit 206 includes a mouse, a keyboard, a touch panel switch provided to superpose on a display screen of the display unit 207, and a like. The display unit 207 displays various data such as a full text retrieval result, and a like. For example, the display unit 207 includes an LCD (Liquid Crystal Display), a CRT (Cathode Ray Tube), or a like. Next, the communication unit 208 is used to communicate with the document storage apparatus 2 and the terminal 3 through the network 5. The communication unit 208 supports communications corresponding to various network types including a wired network, a wireless network, and a like. The hardware configuration of the information processing apparatus 1 is described above.
(Functions)

Figure 3:
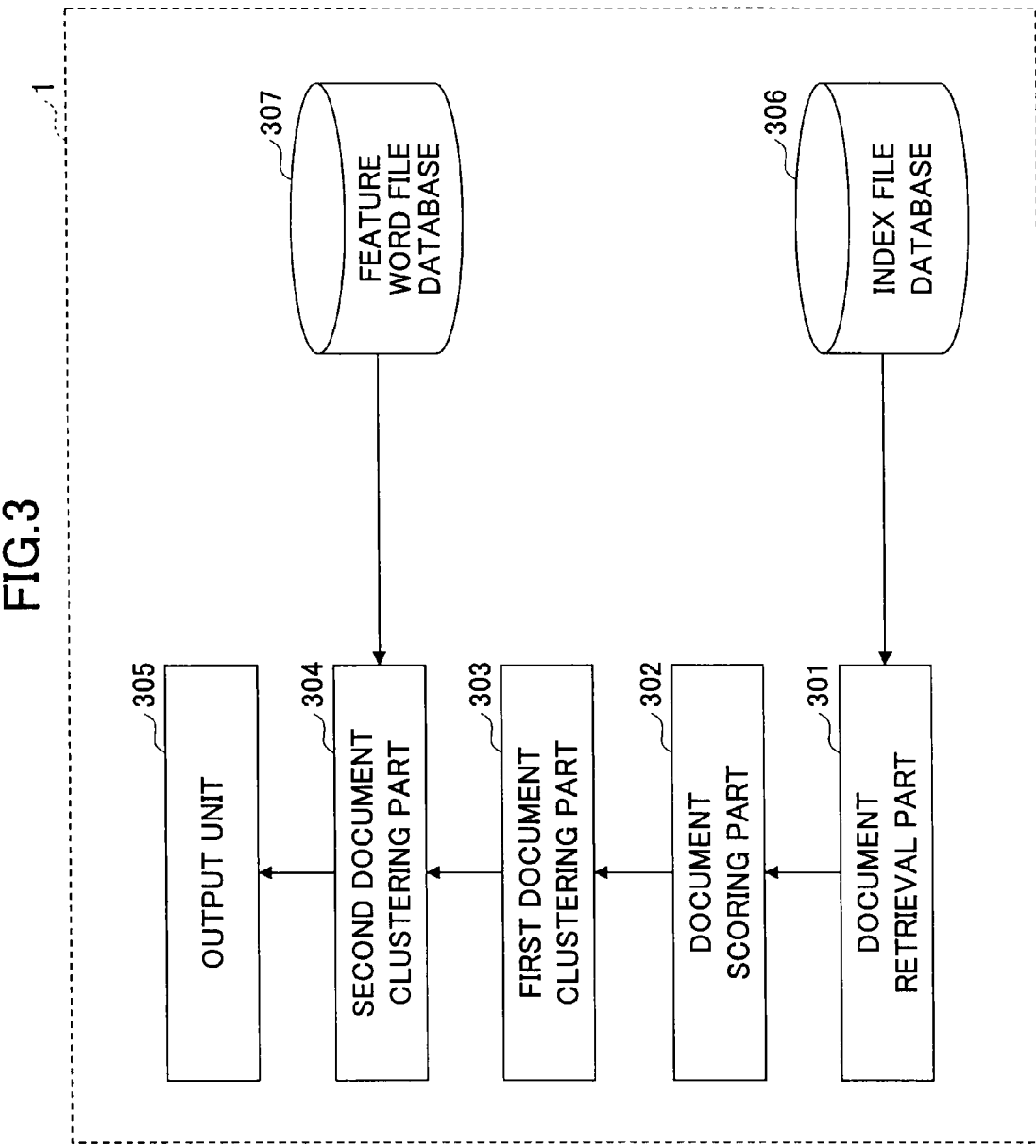
FIG. 3 is a block diagram illustrating a first functional configuration exemplifying main functions of the information processing apparatus according to the present invention.

FIG. 3 is a block diagram illustrating a first functional configuration exemplifying main functions of the information processing apparatus 1 according to the present invention. The information processing apparatus 1 includes a document retrieval part 301, a document scoring part 302, a first document clustering part 303, a second document clustering part 304, an output part 305, an index file database 306, and a feature word file database 307, as main functions.

The document retrieval part 301 retrieves documents relevant to a retrieval condition of retrieval word or a like input by a user from the terminal 3, by conducting a full text retrieval of the documents. In detail, documents including the retrieval word are retrieved by dividing the retrieval word into the same index units as an index file and using the index file of the index file database 306. In general, the index file (inversion index) is created beforehand for a retrieval process in the full text retrieval system. The index file is used for a retrieval.

The document scoring part 302 calculates a score indicating a degree of relevance to the retrieval condition with respect to the documents (hereinafter, called retrieval documents) retrieved by the document retrieval part 301, and orders the retrieval documents by using the scores (document scoring). For example, the retrieval documents are sorted in a score descending order.

The first document clustering part 303 conducts a clustering (grouping) process based on the scores with respect to the retrieval documents which are scored by the document scoring part 302. By clustering the retrieval documents, the retrieval documents are grouped by similarity degrees of the retrieval documents. Details will be explained later. In the retrieval documents being sorted in the score descending order, the retrieval documents being ordered back and forth each other have closer scores acquired by inputting a certain retrieval word and their contents are similar to each other. By focusing on this point, the retrieval documents are clustered. In this functional configuration, the above-described clustering is conducted by the first document clustering part 303 as a first clustering process, and a second clustering process is conducted by the second document clustering part 304 which will be described later. In this manner, the retrieval documents are clustered twice. It should be noted that the document scoring part 302 corresponds to a document grouping part.

The second document clustering part 304 conducts the clustering with respect to the retrieval documents in a cluster, for each of clusters (groups) determined by the first document clustering part 303, based on feature words extracted from full text data of documents and weight values indicating weights of the feature words.

The output part 305 outputs a retrieval result (a list of the retrieval documents) from viewpoints of the scoring and the clustering. For example, the retrieval documents are sorted in the score descending order and a representative document is displayed for each of clusters (groups) in the retrieval result. Details thereof will be described later.

The index file database 306 stores the index file which is registered. The index file is structured so as to retrieve documents at high speed. The document retrieval part 301 uses the index file to retrieve documents corresponding to a retrieval condition such as the retrieval word inputted by a user from the terminal 3. The index file is created beforehand from documents (the entire document data) being stored in the document storage apparatus 2. For example, an inverse index is created from the entire document data (text information) of a document being input by extracting by an index unit by an N-gram method, a morphological analysis method, or a like. Then, this inverse index, text information of the document, and a like are registered in the index file. When the text information is registered, document identification (document ID) is assigned and the document identification and the text information are corresponded to and registered together. Since the index file has a structure possible to inversely retrieve documents including the retrieval word, it is possible to promptly search for documents including the retrieval word by looking up a table of inverse indexes derived from the retrieval word.

The feature word file database 307 stores a feature word file being registered. The feature word file stores a feature word which characterizes a document, and a value indicating a weight of the feature word. The second document clustering part 304 uses the feature word file when the clustering is conducted with reference to a retrieval document. Similar to the index file, the feature word file is created beforehand from documents (the entire document data) being stored in the document storage apparatus 2. In the feature word file, document identification (document ID) for identifying a document is assigned. A method for creating the feature word file will be described later.

The above-described functions are realized by programs executed by the CPU 201. The hardware configuration and the functional configuration of the information processing apparatus 1 according to the present invention are described above. In the following, details of the present invention will be described by accompanying with embodiments.

First Embodiment

Figure 4:
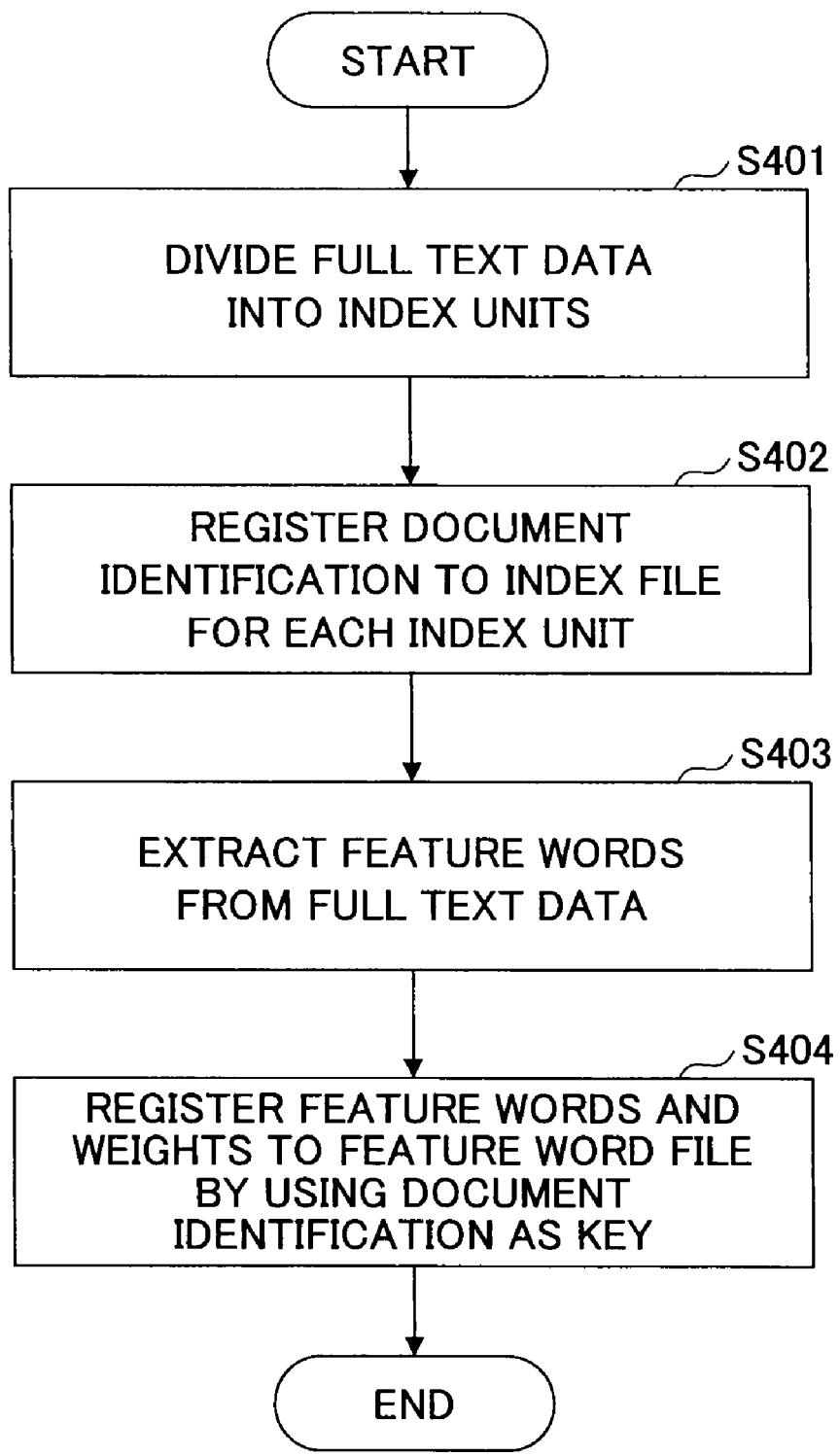
FIG. 4 is a flowchart for explaining a process for creating an index file and a feature file.
Figure 5:
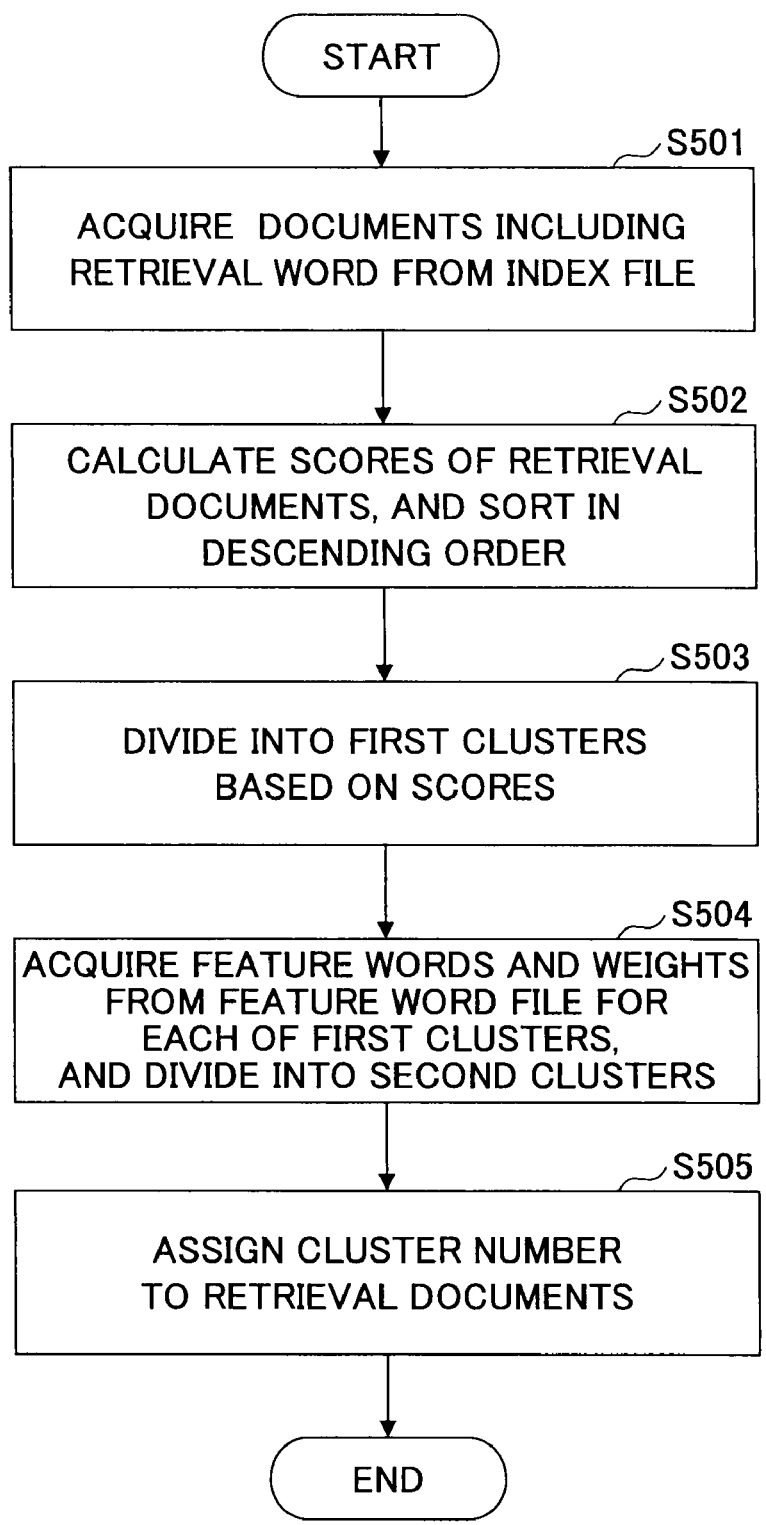
FIG. 5 is a flowchart for explaining a document retrieval process.

One usage example of the information processing apparatus 1 in this embodiment will be described. First, a flow of the entire process will be described. FIG. 4 is a flowchart for explaining a process for creating the index file and the feature file. This stage is a retrieval preparation stage. FIG. 5 is a flowchart for explaining a document retrieval process in response to an input of the retrieval condition (retrieval word). This stage is a retrieval stage. In the following, these processes will be described with reference to FIG. 4 and FIG. 5.

(Retrieval Preparation Stage)

By referring to FIG. 4, the process for creating the index file and the feature file will be described. In step S401, a word is extracted from the entire document data of a document being input by the N-gram method, the morphological analysis method, and the like. In step S402, for example, the inversion index is created, so as to retrieve by using the extracted word as the retrieval unit. When the text information of the document is registered, the document identification (document ID) is assigned, and the document identification and the text information are corresponded to and registered together. A created index file is registered in the index file database 306.

In step S403, words are extracted from the entire document data of the documents which are input, by the N-gram method or the morphological analysis method, and feature words characterizing the documents are extracted based on appearance frequencies of the extracted words. In step S404, the feature words are weighted, and the feature words and their weights (weight values) are registered as the feature word file with the document identification (document ID) to the feature word file database 307. This is the retrieval preparation stage. The index file and the feature word file are used when documents are retrieved (retrieval stage).

(Retrieval Stage)

Next, the document retrieval process conducted in response to an input of the retrieval condition (retrieval word) will be described with reference to FIG. 5. In step S501, when the retrieval word is input, documents are specified by using the index file and are acquired as retrieval documents.

In step S502, the scores indicating the degrees of relevance between the acquired retrieval documents and the retrieval condition are calculated. Each score is calculated for each of the retrieval documents. Then, the retrieval documents are sorted in a descending order of the scores (document scoring).

In step S503, a first clustering (grouping) process is conducted based on the scores with respect to the retrieval documents to which the document scoring is conducted.

In step S504, for each of clusters acquired after the first clustering process is conducted in the step S503, the second clustering process is conducted with respect to the retrieval documents grouped in the cluster, based on the feature words and the weight values indicating the weights of the feature words, by using the document identifications as keys.

In step S505, a cluster number is given to the retrieval documents clustered in each of the clusters. When the retrieval documents are output as a retrieval result to a user, the score and the cluster number are used and displayed as the retrieval result. In the following, a document retrieval stage will be described.

(Document Retrieval)

First, a process for retrieving the retrieval documents corresponding to the retrieval condition by using the index file will be described. This process corresponds to the step S501.

The document retrieving part 301 retrieves the retrieval documents corresponding to the retrieval condition such as the retrieval word, or the like, which is input by the user from the terminal 3, by conducting a full text retrieval of documents. In detail, the retrieval word is divided into the same index unit as the index file, and documents including the retrieval word are searched for by using the index file of the index file database 306.

FIG. 6 is a diagram illustrating a typical data structure of the index file. The index file including an index of an inversion method. The inversion index is created from documents (the entire document data) stored in the document storage apparatus 2, and is generated in the index file. In detail, the index file retains a keyword and a document frequency by corresponding to each other (Structure 1). Moreover, for each keyword, the document ID (document identification) and a frequency-in-document are corresponded to and retained (Structure 2). Furthermore, the document ID and a document length of text data are corresponded to and retained (Structure 3). In addition, the number of registered documents is retained.

(Document Scoring)

Next, a process of the document scoring with respect to the retrieval documents will be described. This process corresponds to the step S502.

The document scoring part 302 calculates the scores indicating the degrees of relevance between documents (retrieval documents) retrieved by the document retrieving part 301 and the retrieval condition, and orders the retrieval documents by using the scores.

For example, it is known that the score can be calculated by the following expression (1):

$$score_1(D_j, Q_i) = \frac{tf_{ij}}{1 - tf_{ij}} \times \frac{\log(N/df_i)}{\log N} \quad (1)$$

In the expression (1), a $score_1$ of a keyword $Q_i$ in a document $D_j$ is calculated. "$tf_{ij}$" denotes the number of appearances of the keyword $Q_i$ in the document $D_j$, that is, "$tf_{ij}$" indicates the frequency-in-document. "$df_i$" denotes the number of documents including keyword $Q_i$, that is, "$df_i$" indicates the document frequency. "N" denotes the number of registered documents. The frequency-in-document in the index file is used as "$tf_{ij}$". The document frequency in the index file is used as "$df_i$". The number of registered documents in the index file is used as "N".

FIG. 7 is a diagram illustrating a state in which the document scoring part 302 calculates the scores of the retrieval documents (document IDs 1 through 10) and sorts the retrieval documents in the descending order of the scores. There is a full text retrieval system which reflects a result illustrated in FIG. 7 to the retrieval result. In this system, documents corresponding to the retrieval condition, which are ordered in an order of the scores, will be output as the retrieval result. On the other hand, in the information processing apparatus 1 according to the present invention, instead of handling this retrieval result as a final retrieval result, the first clustering process and the second clustering process are further conducted with respect to the result illustrated in FIG. 7.

(First Document Clustering)

Next, the first clustering process for the retrieval documents will be described. The first clustering process corresponds to the step S503.

The first document clustering part 303 conducts the first clustering (grouping) process based on the score with respect to the retrieval documents which are scored by the document scoring part 302. A clustering conducted by the second document clustering part 304 after the first clustering process is the second clustering process, which will be described later.

Referring to FIG. 7 again, the retrieval documents, which are sorted in a score descending order similar to the documents of the document IDs 1 through 10, include similar contents, since the retrieval documents are acquired in response to the retrieval word indicated by the user and the scores of the retrieval documents are closer. Accordingly, the first clustering process is conducted by segmenting the scores by a certain range. For example, in a case in that the scores fall in a value range being equal to or more than 0 (zero) and less than 1, the first clustering process classifies the scores into 10 segments as 10 clusters (groups): equal to or more than 0 (zero) to less than 0.1, equal to or more than 0.1 to less than 0.2, . . . , and equal to or more than 0.9 to less than 1, for example.

FIG. 8 illustrates a retrieval result from conducting the first clustering process with respect to the result illustrated in FIG. 7. In the retrieval result in which the retrieval documents are sorted in a score order, four retrieval documents (document IDs "1", "3", "10", and "5") at upper ranks are classified into a cluster A (group A), two retrieval documents (document IDs "4" and "2") at middle ranks are classified into a cluster B (group B), and two retrieval documents (document IDs "6" and "7") at lower ranks are classified into a cluster C (group C).

Moreover, as a modification of the first clustering process, an average rate of change can be used in order to improve a clustering accuracy. The average rate of change for the scores is calculated by the following expression (2):

$$\text{Average Rate of Change} = \sum_{i=1}^{N-1} S_i - S_{i+1} / (N-1) \quad (2)$$

In this expression (2), "$S_i$" denotes the $i^{th}$ score in the retrieval result, and "N" denotes the number of the retrieval documents indicated in the retrieval results. When the average rate of change is calculated by using the result in FIG. 7 and by using the expression (2), a value "0.053" is acquired as the average rate of change. Then, the retrieval documents are segmented at a portion where their scores vary greater than the average rate of change, and are classified into different clusters. According to the result in FIG. 7, a score change from the document ID "5" to the document ID "4" is 0.314, which is greater than the average rate of change (0.053). Due to the greater change, the retrieval documents are classified into different clusters by segmenting between the document ID "5" and the document ID "4". As a result, the retrieval documents are clustered as illustrated in FIG. 9. Four retrieval documents (document IDs "1", "3", "10", and "5") are grouped into a cluster A (group A), and four retrieval documents (document IDs "4", "2", "6", and "7") are grouped into a cluster B (group B).

(Second Document Clustering)

Next, the second clustering process with respect to the retrieval documents will be described. The second clustering process corresponds to the step S504.

The second document clustering part 304 conducts the second clustering process for the retrieval document in each of clusters (in each of groups) resulted from conducting the first clustering process. The second clustering process acquires the feature words and their weights from the feature word file which is registered in the feature word file database 307, and clusters the retrieval documents by recognizing the retrieval documents (document identification) in which some of the feature words are the same, as documents belonging to the same cluster. This case will be described with reference to the result in FIG. 9 as a result from conducting the first clustering process. The document IDs "1", "3", "10", and "5" are classified into the cluster A (group A), and the document IDs "4", "2", "6", and "7" are classified into the cluster B (group B). Subsequently, the second clustering is further conducted to the document IDs "1", "3", "10", and "5" in the cluster A. In the same manner, the second clustering is further conducted to the document IDs "4", "2", "6", and "7" in the cluster B.

In the second clustering process, the feature words and their weights are acquired from the feature word file registered in the feature word file database 307, and the retrieval documents in which some of the feature words are the same are recognized as the documents belonging to the same cluster. FIG. 10 is a diagram illustrating an example of the feature word file in which the feature words and the weights of the feature words are stored by corresponding to the document ID (document identification) used as a key. In the second clustering process, for example, when three or more feature words are the same, it is determined that the retrieval documents belong to the same cluster. In the cluster A for the document IDs "1", "3", "10", and "5", three features words are the same for the retrieval documents of the document ID "1" and the document ID "10". In detail, three feature words "FULL TEXT", "RETRIEVAL", and "INVERSION" are the same. Moreover, four feature words are the same for the retrieval documents of the document ID "3", and the document ID "5". In detail, four feature words "FULL TEXT", "RETRIEVAL", "VECTOR", and "HIGH SPEED" are the same. Accordingly, in the cluster A, as a result from the second clustering process, the retrieval documents are classified into a cluster for the document ID "1" and the document ID "10", and a cluster for the document ID "3" and the document ID "5". In the same manner, in the cluster B for the document IDs "4", "2", "6", and "7", since three features words are the same, the document IDs "4", "2", and "7" are classified into the same cluster.

FIG. 11 illustrates a result from the second scoring process. The retrieval documents are classified into four clusters (groups) and cluster numbers 1 through 4 are assigned (corresponding to the step S505). Contents of the retrieval documents, which are classified into the same cluster, are analogous. Conclusively, the result illustrated in FIG. 11 is output to the output part 305.

Moreover, as a modification of the second clustering process, in order to improve a clustering accuracy, feature words of each document are expressed by document vectors, the retrieval documents are clustered by using a cosine of an angle of the vectors. In this modification, it is well known that a clustering using the cosine of the angle formed by the document vectors is conducted by calculating the following expression (3):

$$s(d_i, d_h) = \frac{\sum_{j=1}^{M} W_{ij} W_{hj}}{\sqrt{\sum_{j=1}^{M} W_{ij}^2} \sqrt{\sum_{j=1}^{M} W_{hj}^2}} \quad (3)$$

The features words are expressed by vectors and the cosine of the angle formed by the document vectors between two documents. If the cosine is within a certain threshold, it is determined that the two documents belong to the same cluster. The cosine of the angle formed by the document vectors is acquired for each combination of two documents.

For example, vectors of the feature words are expressed as follows:
d1=(1, 1, 1, 1, 0, 0)
d3=(1, 1, 0, 0, 1, 1)
The feature words of documents of the document ID "1" and "3" are listed as (FULL TEXT, RETRIEVAL, INVERSION, SCORE, VECTOR, HIGH SPEED). In this order, the feature words are depicted by vectors by applying weights (value "1"). Then, cosine s(d1, d3) is calculated and a value "0.5" is acquired.

Also, the feature words for the document ID "1" and the document ID "10" are listed as (FULL TEXT, RETRIEVAL, INVERSION, SCORE, WEIGHT). The weights are expressed by using vectors in this order as follows:
d1=(1, 1, 1, 1, 0)
d10=(1, 1, 1, 0, 1)
Then, cosine s(d1, d10) is calculated and a value "0.75" is acquired. In the same manner, cosine s(d1, d5) is 0.5 for the document ID "1" and the document ID "5".

If it is assumed that documents among which values of cosine are equal to or greater than 0.7 belong to the same cluster (the greater a value of cosine, the closer a distance between documents. That is, the documents are analogous), even in the cluster A, it is determined that the retrieval documents of the document ID "1" and the document ID "10" belong to the same cluster and the retrieval documents of the document ID "3" and the document ID "5" belong to the same cluster. The similar process is conducted to the retrieval documents belonging to the cluster B, and a result is acquired as illustrated in FIG. 11.

As described above, cosine of the angle formed by the document vectors can be obtained only between two documents. The same manner is applied in a method for determining that documents belong to the same cluster if more than two feature words are the same. That is, in this manner, a similarity degree between each set of two documents in all documents is concerned and the clustering is conducted based on all similarity degrees among all documents. Thus, a considerably large amount of calculation is required. In order to reduce a calculation amount, various methods have been presented. In the present invention, in order to promptly acquire a retrieval result, first, the first clustering process is conducted by using the score acquired when documents are retrieved. Next, the second clustering process is conducted after the number of calculation subjects (calculation amount) are reduced by the first clustering process. For the sake of convenience, in this embodiment, the number of the retrieval documents is "10". Actually, the greater the number of the retrieval documents, the greater the difference between time consumption (calculation amount) required for the present invention and time consumption (calculation amount) required for the conventional clustering method.

(Output of Retrieval Result)

The output part 305 outputs a retrieval result (a list of the retrieval documents) from the scores and the first and second clustering processes. Referring to FIG. 11, the cluster number is assigned to each of the retrieval documents (document ID "1" through "10") and are grouped based on the cluster numbers, by the above described first and second clustering processes.

In many full text retrieval systems using an inversion index, as described above, when a retrieval result list is displayed, a relevance rate between an input keyword and each of documents being retrieved is expressed as a score which is numerical value, the retrieval result list (a ranking retrieval) lists the documents from greater numbers. However, if a ranking retrieval is simply conducted with respect to the same documents and analogous documents, score values of the same documents and analogous documents are approximately the same. As a result, analogous documents are successively listed and displayed when these documents are sorted in a score order. Accordingly, in the present invention, by a document clustering for classifying the same or analogous documents, the same or analogous documents are grouped as a retrieval subject. Thus, only a representative document is listed and displayed for each group in the retrieval result. By this process, it is possible to avoid listing documents having similar contents and to display the retrieval result which is concise and easily recognizable.

FIG. 12 illustrates an example of the retrieval result (the list of the retrieval documents) output from the output part 305. In FIG. 12, the retrieval documents are sorted in a score descending order, and the representative document (a top document) is displayed for each of clusters (groups) 1 through 4 in the retrieval result. In addition, three retrieval documents (document IDs "4", "2", and "7") belong to the cluster 3, and two retrieval documents of the document IDs "2" and "7" are associated with the retrieval document of the document ID "4" being the representative document and can be browsed.

As described above, the information processing apparatus 1 according to the embodiment conducts the first clustering process using the score which is acquired when the retrieval is conducted, and then, conducts the second clustering process after the number of calculation subjects (calculation amount) is reduced. Accordingly, the retrieval documents are effectively clustered. As a result, it is possible to promptly present the retrieval result. That is, according to the present invention, it is possible to present an information processing apparatus, a full text retrieval method, and a computer-readable encoding medium recorded with a computer program thereof, in which the document clustering is effectively conducted, and a target document can be easily achieved due to a concise and easily recognizable full text retrieval result.

(Extraction of Feature Words)

An extraction of the feature words will be described. The feature words are registered with their weights in the feature word file. Also, as described above, in the second clustering process, the retrieval documents are clustered (determined) based on the feature words and their weights (weight values) registered in the feature word file. A clustering result (clustering accuracy) influences which words are recognized as the feature words in a document. Thus, a method for extracting the feature words to conduct a more accurate clustering process (corresponding to the second clustering process) will be described in the following.

A value of a TFIDF (TF(Term Frequency)–IDF(Inverse Document Frequency)) is a value used to extract the feature words. The TFIDF is an algorithm for extracting feature words (words recognized as important) in sentences of a document, and is used in fields such as an information retrieval, a document abstract, and a like.

The TFIDF value is acquired from a TF value denoting an appearance frequency of each of words obtained from a document (full text data) and a DF (Document Frequency) value (or an IDF value being an inverse document frequency) which is an appearance frequency of a word acquired from searching in a corpus. Words having the TFIDF values equal to or more than a certain threshold are extracted as the feature words. The corpus is like a database including a large number of words, and stores words and appearance frequencies (DF values) of the words. The TFIDF lowers an importance level with respect to general words which appear in many documents, and heightens the importance level with respect to words which appear in specific documents.

For example, an extraction condition of the feature words is as follows:
 1. all words of which the TFIDF values are equal to or greater than a certain threshold
 2. N words from a top rank in words of which the TFIDF values are equal to or greater than a certain threshold Moreover, weight values are obtained from the IF value denoting an appearance frequency of words acquired from the document (full text data) and a cost for morpheme occurrence acquired when a morphological analysis is conducted, words of which the weight values are equal to or greater than the certain threshold are extracted as the feature words. The cost for morpheme occurrence is a numerical value expressing an appearance likelihood of the word, and can be used in the same manner as the DF value indicating the appearance frequency within the corpus. Since words having a greater cost for morpheme occurrence tend to appear in the corpus, words of which the cost for morpheme occurrence is smaller and the TF value is greater are determined as the feature words of the document.

For example, the extraction condition of the feature words is as follows:
 1. all words of which the weight values are equal to or greater than a certain threshold
 2. N words from a top rank in words of which the TFIDF values are equal to or greater than a certain threshold Second Embodiment An operation example of an information processing apparatus 1-2 according to a second embodiment will be described. In the first embodiment, the information processing apparatus 1 conducts the first clustering process with respect to the retrieval documents based on the scores. After that, the information processing apparatus 1 conducts the second clustering process with respect to the retrieval documents in each of clusters. The score indicates a degree of relevance to a retrieval condition, and is different from a distance between documents subject to be clustered. Accordingly, documents having closer scores are analogous at high probability. However, there are analogous documents of which the scores are not always closer to each other. For example, referring back to FIG. 10, the feature words and their weights of the document of the document ID "6" are the same as (or similar to) those of the documents of the documents IDs "3" and "5". However, in the result from the second clustering process in FIG. 11, different cluster numbers are assigned to the documents after the documents are clustered. That is, the document of the document ID "6" is clustered into the cluster 4, and the documents of the document IDs "3" and "5" are clustered into the cluster 5. The first clustering process using the score recognizes that the document of the document ID "6" belongs to a different cluster from the documents of the document IDs "3" and "5". Accordingly, in the second embodiment, in order to deal with a case of the documents of which the scores are not always closer but which are analogous, a merge process is further conducted to merge between clusters based on the second clustering result.

(Functions)

Figure 13:
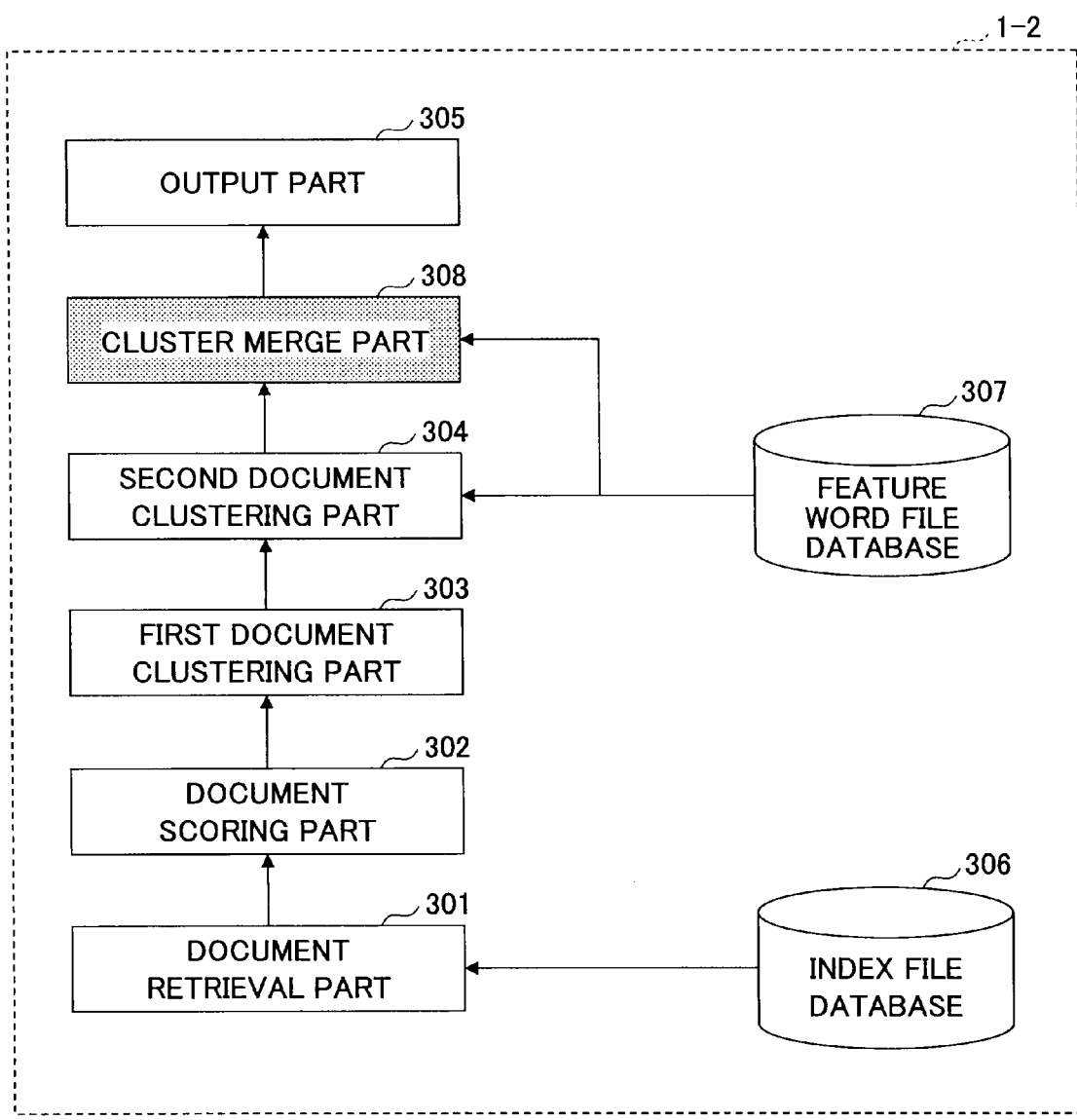
FIG. 13 is a block diagram illustrating main functions of an information processing apparatus according to a second embodiment of the present invention.

FIG. 13 is a functional block diagram illustrating main functions of the information processing apparatus 1-2 according to the second embodiment of the present invention. In FIG. 13, the information processing apparatus 1-2 includes a document retrieval part 301, a document scoring part 302, a first document clustering part 303, a second document clustering part 304, an output part 305, an index file database 306, a feature word file database 307, and a cluster merge part 308, as the main functions.

The above functional parts 301 through 307 other than the cluster merge part 308 are the same as the functional parts 301 through 307 described in the first embodiment, and the explanation thereof will be omitted.

(Merge Process Between Clusters)

Figure 14:
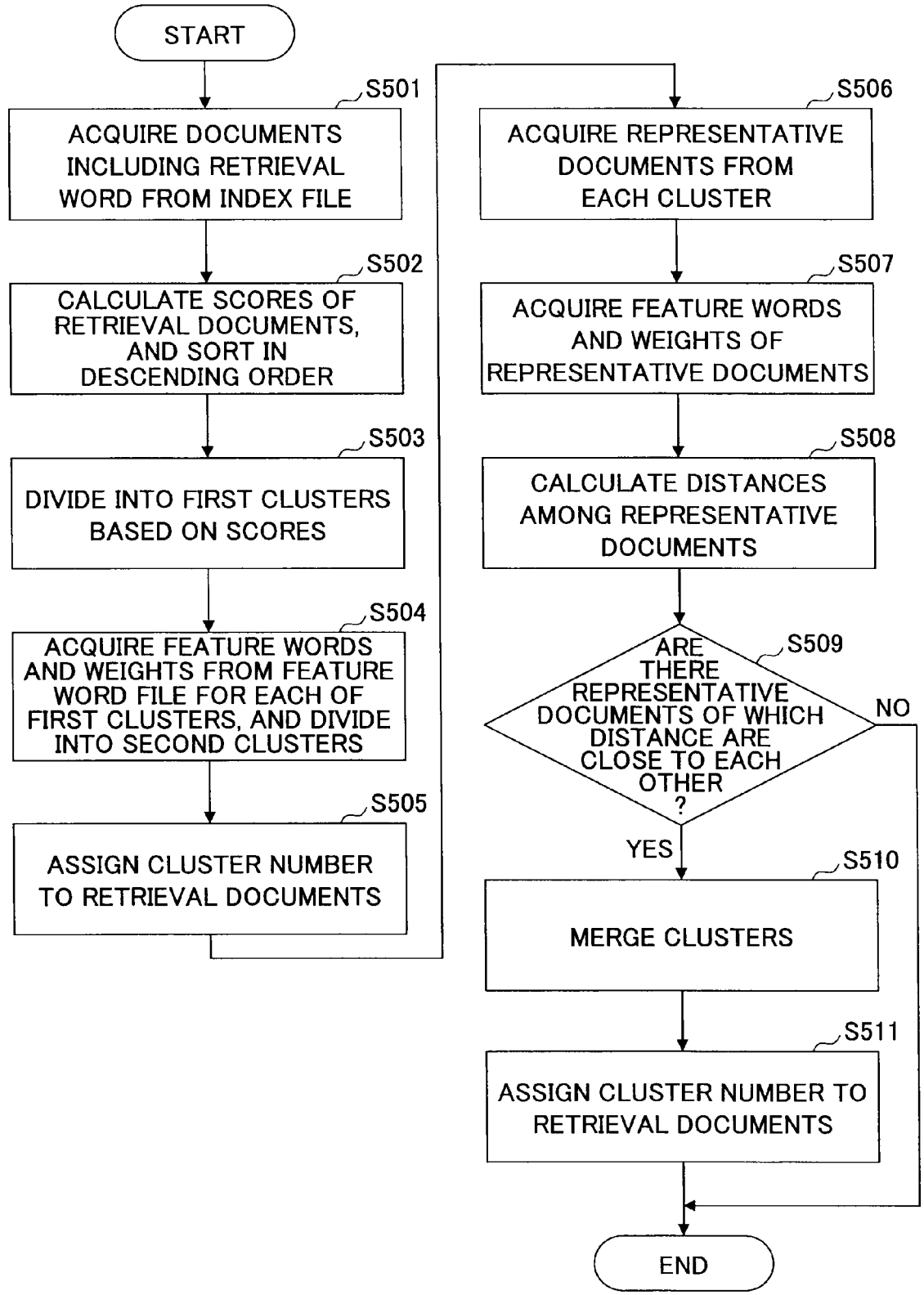
FIG. 14 is a flowchart for explaining a merge process for merging between clusters.

Next, the merge process for merging between clusters will be described in detail. FIG. 14 is a flowchart for explaining the merge process for merging between clusters, according to the second embodiment. In FIG. 14, steps S501 through S505 are the same as the steps S501 through S505 described with reference to FIG. 5 in the first embodiment, and the explanation thereof will be omitted. In the step S505 in FIG. 14, the second clustering process is conducted and the clusters numbers are assigned to the retrieval documents. For example, referring to FIG. 11, the retrieval documents are classified into the clusters 1 through 4 based on the result of the second clustering process. In the following, the merge process for merging between clusters will be described.

In step S506, the cluster merge part 308 acquires the representative document from each of clusters. In detail, for example, the cluster merge part 308 acquires a top ranking document having the highest score as the representative document in each of clusters, from the retrieval documents classified into the clusters by the second clustering process. In the result of the second clustering process illustrated in FIG. 11, the retrieval documents are classified into four clusters 1 through 4, and the representative documents from respective clusters 1 through 4 are documents of the document IDs "1", "3", "4", and "6", which are the top ranking documents having the highest scores.

In step S507, the cluster merge part 308 newly acquires the feature words and their weights corresponding to the representative documents from the feature word file registered in the feature word file database 307. In detail, the cluster merge part 308 acquires the feature words and their weights corresponding to the retrieval documents of the document IDs "1", "3", "4", and "6" as the representative documents.

In step S508, the cluster merge part 308 calculates distances among the representative documents (among clusters) by using the feature words and their weights of the representative documents from the respective clusters. The second clustering process described above can be applied to a distance calculation. For example, regarding the retrieval document of the document ID "3" and the retrieval document of the document ID "6", the feature words and their weights are acquired as (FULL TEXT, 1), (RETRIEVAL, 1), (VECTOR, 1), and (HIGH SPEED, 1). For example, the number of feature words matching between the retrieval documents is calculated as the distance between clusters. The distance is calculated between each set of two representative documents. Alternatively, for example, a document vector is expressed by the feature word and its weight for each of representative documents, and cosine of an angle formed by two document vectors of two representative documents is calculated as the distance. The cosine of the angle formed by two document vectors is acquired for each set of two representative documents.

In step S509, the cluster merge part 308 determines whether or not there are representative documents having a closer distance, by comparing with a predetermined threshold. For example, in a case in which more than a threshold count (for example, three words) of the feature words are identical between two representative documents, the two representative documents are closer in distance. Alternatively, if the cosine of the angle formed by the document vectors is within a predetermined threshold (cosine 0.7), it is determined that the two representative documents are closer in distance.

In step S510, when it is determined that the two representative document are closer in distance, the cluster merge part 308 merges two clusters to which the two representative documents belong. For example, since four feature words are identical between the document of the document ID "3" and the document of the document ID "6", it is determined that the document of the document ID "3" and the document of the document ID "6" are closer in distance. Since the two representative documents are closer in distance, the cluster 2 and the cluster 4 are closer in distance. Accordingly, in this case, the cluster 2 and the cluster 4 are merged.

In step S511, a cluster number is newly assigned to merged retrieval documents. FIG. 15 is a diagram illustrating an example of a merge process result from merging between clusters. In FIG. 15, the retrieval document of the document ID "6" which belonged to the cluster 4 is merged (integrated) to the cluster 2.

FIG. 16 is a diagram illustrating an example of a retrieval result (a list of the retrieval documents) output by the output part 305 after the merge process is conducted. The retrieval documents are sorted in the score descending order, and the representative documents (top documents) from relative clusters (groups) 1 through 3 in the retrieval result. Moreover, three retrieval documents (of the document IDs "3" and "5", and the document ID "6" being merged from the cluster 4) belong to the cluster 2, and the retrieval documents of the document IDs "5" and "6" are associated to the document of the document ID "3" being the representative document to be displayed under the document ID "3".

On the other hand, in step S509, in a case of determining that there are no representative documents closer to each other in distance, the merge process is not required between the clusters, and is terminated without being conducted. In this case, the process result in the step S505 (for example, refer to FIG. 11) is retained.

According to the second embodiment, the information processing apparatus 1-2 further conducts the merge process between two clusters based on the result of the second clustering process. In a case that there are analogous retrieval documents but the scores of the analogous retrieval documents are not always closer, it is possible to classify the analogous retrieval documents into the same cluster even if the scores are not close to each other. Accordingly, accuracy of the retrieval result can be improved.

As described above, in the second embodiment, the retrieval documents are classified into the four clusters 1 through 4 based on the result of the second clustering process, and the merge process is appropriately conducted among the four clusters. However, in a case in which there are considerably many clusters depending on the result of the second clustering process, the calculation becomes a considerable amount if each of distances among the representative documents in the respective clusters (among the clusters) is calculated. Therefore, an upper count limit of the representative documents to be subjects may be defined for the calculation of the distances among the representative documents in the respective clusters. Therefore, the calculation amount can be reduced.

For example, it is assumed that the retrieval documents are classified into 100 clusters based on the result of the second clustering process. If each of distances between a representative document in one cluster and a plurality of representative documents in all clusters other than the one cluster is calculated, the calculation counts are as follows:

$$100 \times 99 / 2 = 4950$$

The calculation is a significantly large amount. Accordingly, for example, the number of clusters as merge subjects is restricted at the most until five further clusters from a cluster. By calculating distances between a representative document in one cluster and five representative documents respectively in the five further clusters, the calculation counts are as follows:

$$(100-5) \times 5 + 4 + 3 + 2 = 484$$

As described above, in the calculation of the distances among representative documents in respective clusters, a upper limit of the number of representative documents as the merge subjects is defined, so as to significantly reduce the calculation counts from 4950 to 484, for example.

In the second embodiment, in order to deal with a case in that there are analogous documents of which the scores are not always closer to each other, the merge process is conducted to merge between clusters. However, all the same, the retrieval documents having closer scores are analogous documents at higher possibility. In other words, while assuming that there are analogous documents of which the scores are not always closer, it is assumable that the representative documents belonging to different clusters and having a significantly great difference between their scores are still different documents. Accordingly, since the retrieval documents in the clusters are sorted in each of the clusters, by defining the predetermined number of clusters as the upper limit of the number of the representative documents to be subjects, it is possible to reduce the calculation amount and to effectively conduct the document clustering.

According to the present invention, it is possible to present an information processing apparatus, a full text retrieval method, and a computer-readable encoding medium recorded with a computer program thereof, in which the document clustering is effectively conducted, and a target document can be easily achieved due to a concise and easily recognizable full text retrieval result which is promptly displayed.

The present invention is not limited to the specifically disclosed embodiments, and variations and modifications may be made without departing from the scope of the invention.

The present application is based on the Japanese Priority Patent Applications No. 2008-139762 filed May 28, 2008 and No. 2009-077243 filed Mar. 26, 2009, the entire contents of which are hereby incorporated by reference.

What is claimed is:

1. An information processing apparatus for creating a retrieval result displaying a list of retrieval documents, comprising:
   a computer memory that stores a feature word file database configured to register, for each of a plurality of stored documents, document identification identifying the document, feature words extracted from full text data of the document, and weight values indicating weights of the feature words in which the feature words and the weight values are corresponded to the document identification;
   a computer processor;
   a document retrieval part, executable by the computer processor, configured to retrieve the retrieval documents, from among the plurality of stored documents, corresponding to a retrieval condition by conducting a full text retrieval of documents;
   a document scoring part, executable by the computer processor, configured to order the retrieval documents by scores indicating degrees of relevance to the retrieval condition;
   a document grouping part, executable by the computer processor, configured to group the retrieval documents into a plurality of groups based on an average rate of change of all the scores such that the groups are divided at a point where a difference in respective scores between two retrieval documents is greater than the average rate of change of all the scores; and
   a document clustering part, executable by the computer processor, configured to conduct a clustering process with respect to the retrieval documents based on the feature words and the weight values of the feature words acquired from the feature word file database, by using the document identifications of the retrieval documents as keys,
   wherein the average rate of change of the scores indicates a clustering accuracy, and the document clustering part conducts the clustering process with respect to the retrieval documents in a group, for each of the plurality of groups to which the retrieval documents are grouped by the document grouping part;
   wherein the feature words are extracted based on first values indicating appearance frequencies of words obtained from the full text data and second values indicating appearance frequencies of morpheme occurrences obtained when a morphological analysis is conducted, wherein a morpheme is a smallest semantically meaningful unit in a language, and the morphological analysis analyzing behavior and combination of morphemes.

2. The information processing apparatus as claimed in claim 1, wherein the document clustering part expresses the feature words by vectors, and conducts the clustering process with respect to the retrieval documents based on values of cosines of angles formed by the vectors.

3. The information processing apparatus as claimed in claim 1, wherein the feature words are extracted based on the first values indicating the appearance frequencies of words obtained from the full text data and third values indicating appearance frequencies of words obtained from a corpus containing a large and structured set of texts.

4. The information processing apparatus as claimed in claim 1, further comprising a cluster merge part configured to express the feature words of the retrieval document in each of clusters in which the clustering process is conducted by the clustering process part by vectors, and merge clusters in which the retrieval documents are closer than a predetermined threshold in distance.

5. A full text retrieval method in an information processing apparatus for creating a retrieval result displaying a list of retrieval documents, the method executable by a computer processor and comprising steps of:
   retrieving, by a document retrieval part, the retrieval documents, from among a plurality of stored documents, corresponding to a retrieval condition by conducting a full text retrieval of documents;
   ordering, by a document scoring part the retrieval documents by scores indicating degrees of relevance to the retrieval condition;
   grouping, by a document grouping part, the retrieval documents based on the scores into a plurality of groups based on an average rate of change of all the scores such that the groups are divided at a point where a difference in scores between two retrieval documents is greater than the average rate of change of all the scores, wherein the average rate of change of the scores indicates a clustering accuracy; and
   conducting a clustering process, by a document clustering part, with respect to the retrieval documents based on feature words of the documents extracted from full text data of the documents and weight values indicating weights of the feature words, wherein the document clustering part conducts the clustering process with respect to the retrieval documents in a group, for each of the groups to which the retrieval documents are grouped by the document grouping part;

wherein the feature words are extracted based on first values indicating appearance frequencies of words obtained from the full text data and second values indicating appearance frequencies of morpheme occurrences obtained when a morphological analysis is conducted, wherein a morpheme is a smallest semantically meaningful unit in a language and the morphological analysis analyzing behavior and combination of morphemes.

6. A non-transitory computer-readable recording medium recorded thereon a computer program for causing an information processing apparatus to perform a full text retrieval method for creating a retrieval result displaying a list of retrieval documents, the method comprising:

retrieving, by a document retrieval part, the retrieval documents, from among a plurality of stored documents, corresponding to a retrieval condition by conducting a full text retrieval of documents;

ordering, by a document scoring part, the retrieval documents by scores indicating degrees of relevance to the retrieval condition;

grouping, by a document grouping part, the retrieval documents into a plurality of groups based on an average rate of change of all the scores such that the groups are divided at a point where a difference in respective scores between two retrieval documents is greater than the average rate of change of all the scores; and conducting a clustering process, by a document clustering part, with respect to the retrieval documents based on feature words of the documents extracted from full text data of the documents and weight values indicating weights of the feature words, wherein the average rate of change of the scores indicates a clustering accuracy, and the document clustering part conducts the clustering process with respect to the retrieval documents in a group, for each of the plurality of groups to which the retrieval documents are grouped by the document grouping part;

wherein the feature words are extracted based on first values indicating appearance frequencies of words obtained from the full text data and second values indicating appearance frequencies of morpheme occurrences obtained when a morphological analysis is conducted, wherein a morpheme is a smallest semantically meaningful unit in a language, and the morphological analysis analyzing behavior and combination of morphemes.

\* \* \* \* \*